(12) United States Patent
Yang et al.

(10) Patent No.: US 7,975,273 B2
(45) Date of Patent: Jul. 5, 2011

(54) FUZZING SYSTEM AND METHOD OF DISTRIBUTED COMPUTING ENVIRONMENT (DCE) REMOTE PROCEDURE CALL (RPC)

(75) Inventors: Jin Seok Yang, Daejeon (KR); Tae Ghyoon Kim, Daejeon (KR); Hyoung Chun Kim, Daejeon (KR); Soonjwa Hong, Daejeon (KR); Do Hoon Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 861 days.

(21) Appl. No.: 11/963,927

(22) Filed: Dec. 24, 2007

(65) Prior Publication Data

US 2008/0263572 A1    Oct. 23, 2008

(30) Foreign Application Priority Data

Apr. 19, 2007    (KR) .................. 10-2007-0038384

(51) Int. Cl.
G06F 3/00    (2006.01)
(52) U.S. Cl. ...................................... 719/330
(58) Field of Classification Search ............ 719/330
See application file for complete search history.

(56) References Cited

U.S. PATENT DOCUMENTS 6,782,392 B1* 8/2004 Weinberger et al. ............ 1/1
2004/0034862 A1* 2/2004 Kadota ...................... 719/321

FOREIGN PATENT DOCUMENTS

KR    1020040040628    5/2004

OTHER PUBLICATIONS

Robert Deline, Avoiding Packaging Mismatch with Flexible Packaging, Feb. 2001.*
Nik Looker, et al.; "Assessing the Dependability of SOAP RPC-Based Web Services by Fault Injection;" Proceedings of the Ninth IEEE International Workshop on Object-Oriented Real-Time Dependalble Systems (WORDS'03).

* cited by examiner

*Primary Examiner* — Lechi Truong
(74) *Attorney, Agent, or Firm* — Ladas & Parry LLP (57) ABSTRACT

Provided are a fuzzing system and method of a distributed computing environment (DCE) remote procedure call (RPC) object. The fuzzing system includes a file manager, a random data generator, a RPC packet, and a packet injector. The file manager obtains necessary information by parsing and analyzing an idl file for a target object for fuzzing and a file having information about a Named Pipe file. The random data generator generates a random value using a system clock as a factor. The RPC packet creator embodies protocols used for RPC communication by functions and generating a RPC packet for RPC communication. The packet injector inserts the necessary information and the random value into the generated RPC packet and transmits the generated RPC packet to the target object for fuzzing.

14 Claims, 8 Drawing Sheets

```
// example.idl
[
  //idl PROPERTY DEFINING UNIT
  uuid(xxxxxxxx-xxxx-xxxx-xxxx-xxxxxxxxxxxx),
  version(1.0)
]
interface example
{
  // idl FUNCTION DEFINING UNIT
  void function([in, string] unsigned char* str);
}
```

```
#UUID = ＃＃ PIPE NAME
6BFFD098-A112-3610-9833-012892020162 = ＃＃ browser
4B324FC8-1670-01D3-1278-5A47BF6EE188 = ＃＃ srvsvc
```

FIG. 8

FUZZING SYSTEM AND METHOD OF DISTRIBUTED COMPUTING ENVIRONMENT (DCE) REMOTE PROCEDURE CALL (RPC)

BACKGROUND OF THE INVENTION

1. Field of the Invention

The present invention relates to a fuzzing system and method of a distributed computing environment (DCE) remote procedure call (RPC) object, and more particularly, to a fuzzing system and method of a DCE RPC object for automating a process of obtaining necessary information by analyzing an idl file when a fuzzing process is performed on a DCE RPC object.

2. Description of the Related Art

Fuzzing is one of security testing methods. That is, fuzzing is a testing scheme for testing whether a testing object operates properly or not by inputting random values to functions of software or files.

According to the related art, user used distributed computing environment (DCE) remote procedure call (RPC) fuzzing tools to analyze the remote access mechanism of RPC based software. After analyzing, the analyzed access mechanism was embodied and tested. Then, necessary information was collected and revised by analyzing a test packet. After collecting and revising, the necessary information was analyzed, revised, and embodied again. As described above, many processes were performed for the DCE RPC access mechanism because the DCE RPC access mechanism was dependable to an operating system.

However, the DCE RPC fuzzing tools may not access a computer, a target for fuzzing, if the embodied access mechanism was incorrect. In this case, the access mechanism was analyzed through analyzing a packet level, and the access mechanism was revised for fuzzing. In addition, a set of predetermined processes was performed for fuzzing a DCE RPC related service function. In this case, a user was required to directly find and input information about a universally unique identifier (UUID) and an interface version for fuzzing. In order to find and input such information, a user was required to understand a DCE RPC mechanism and to learn a method and tool for finding necessary information.

As described above, it was very inconvenient for performing a remote DCE RPC fuzzing process according to the related art because the user was required to understand a target object for testing and to modify a fuzzing tool for performing a remote DCE RPC fuzzing process according to the related art. Such a remote DCE RPC fuzzing process has disadvantages, which required an expert to perform and consumed comparatively long time. That is, the efficiency of a fuzzing method according to the related art is deteriorated in a view of a time and a cost. Also, it was required to modify a related fuzzing tool, thereby further lowering the efficiency thereof in a view of a time and a cost.

SUMMARY OF THE INVENTION

Accordingly, the present invention is directed to a fuzzing system and method of a DCE RPC object, which substantially obviates one or more problems due to limitations and disadvantages of the related art.

It is an object of the present invention to provide a fuzzing system and method of a DCE RPC object for reducing a cost and shortening a time for fuzzing by obtaining necessary information through analyzing an idl file when fuzzing a DCE RPC object and embodying a RPC based access mechanism using the obtained information.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a fuzzing system of a distributed computing environment (DCE) remote procedure call (RPC) object, including: a file manager for obtaining necessary information by parsing and analyzing an idl file for a target object for fuzzing and a file having information about a Named Pipe file; a random data generator for generating a random value using a system clock as a factor; a RPC packet creator for embodying protocols used for RPC communication by functions and generating a RPC packet for RPC communication; and a packet injector for inserting the necessary information and the random value into the generated RPC packet and transmitting the generated RPC packet to the target object for fuzzing.

In another aspect of the present invention, there is provided a fuzzing method of a distributed computing environment (DCE) remote procedure call (RPC) object, including the steps of: a) obtaining necessary information from an idl file for a target object for fuzzing and a file including information about a Named Pipe file at a file manager, and generating a random value at a random data generator; and b) at a packet injector, inserting the necessary information and the random value into a RPC packet generated from a RPC packet creator for the RPC communication and transmitting the generated RPC packet to a target object for fuzzing.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention, are incorporated in and constitute a part of this application, illustrate embodiments of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Figure 1:
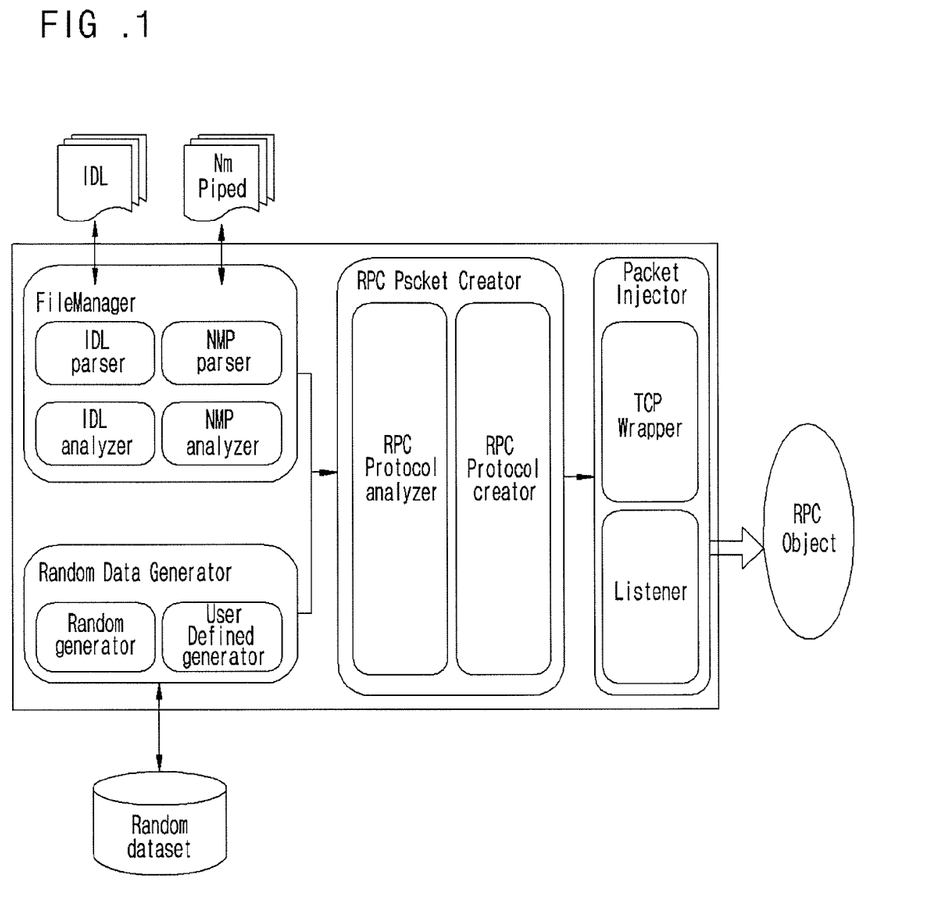
FIG. 1 is a diagram illustrating a ROAD system.

FIG. 1 is a diagram illustrating a RPC Object vulnerability Automatic Detector (ROAD) system.

As shown in FIG. 1, the fuzzing system of a DCE RPC object includes a file manager, a random data generator, a RPC packet creator, and a packet injector.

The file manager includes an interface definition language (IDL) parser and a network management protocol (NMP) parser for parsing an idl file and a file having Named Pipe related information, and an interface definition language (IDL) analyzer and a network management protocol (NMP) analyzer for analyzing the idl file and the Named Pipe file and returning necessary information.

The random data generator includes a random data generator for processing a random number or a previously defined attacking character string and a user defined generator for processing a user defined input.

The RPC packet creator includes a RPC protocol analyzer for embodying a server message block (SMB) protocol used for RPC communication and a RPC protocol by a function and a RPC protocol creator for reassembling a packet for RPC communication.

Idl Data Set

Figure 5:
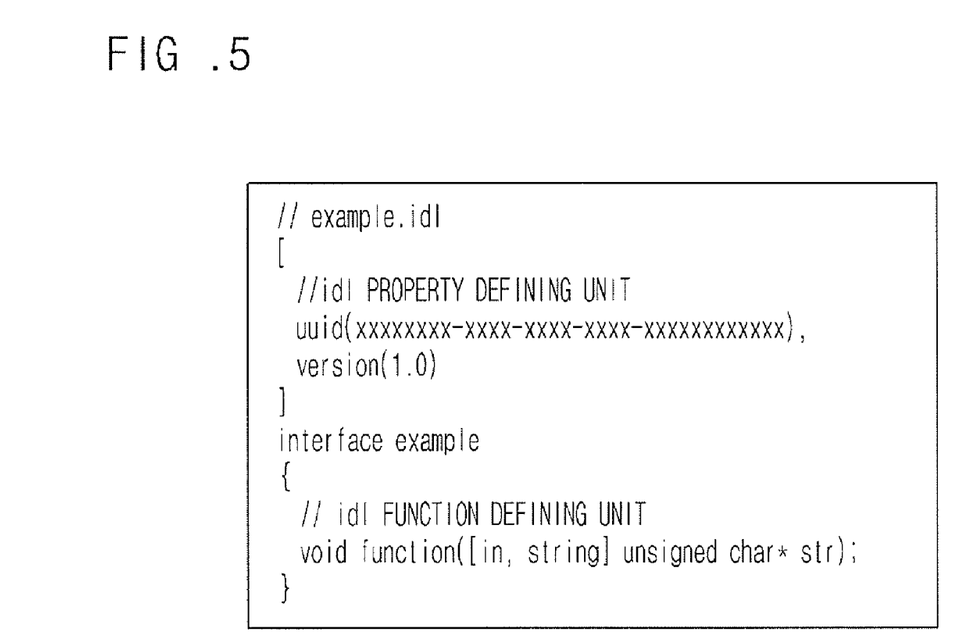
FIG. 5 is a diagram illustrating a typical method for defining an idl file.

The idl data set denotes the idl file of a RPC based program, which is a target object for fuzzing. The idl file generally has a predetermined format. FIG. 5 shows a basic format of an idl file.

Referring to FIG. 5, the fuzzing system according to the present embodiment needs information about an UUID of an idl property defining unit, interface version information, and information about the number of functions corresponding to an operation number (OP number) of the idl function defining unit from the idl file. The corresponding information is necessary information to access a RPC based service.

Named Pipe Data Set

Figure 7:
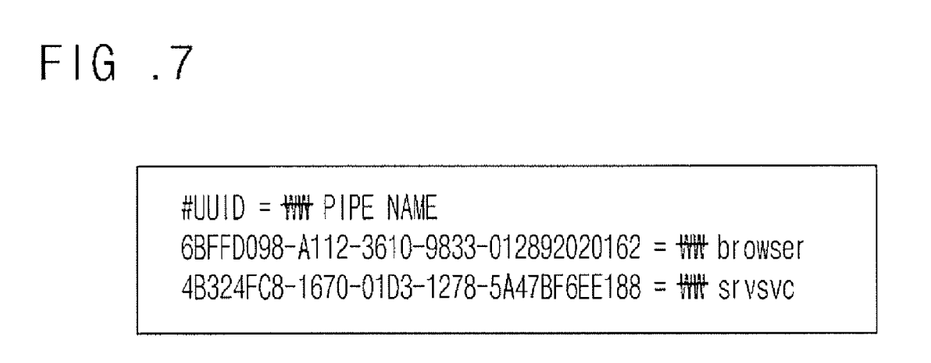
FIG. 7 is a diagram illustrating a data set having a UUID mapped to a Named Pipe.

The Named Pipe data set is a data set including information about Named pipe information mapped to an UUID used by target software for fuzzing. The Named Pipe data set is defined as shown in FIG. 7.

The Named Pipe information mapped to the UUID can be easily obtained because it is opened in the Internet. In the present embodiment, the Named Pipe information mapped to the UUID must be defined in the Named Pipe data set for fuzzing.

Random Data Set

It is possible to process a random number in various methods. In the present embodiment, a previously defined data set and a randomly generated data set are used. The previously defined data set denotes a well-known attacking character string data set, and the randomly generated data set denotes a data set generated using a function generating a random number.

| Example of previously defined data set | Example of random number data set |
|---|---|
| :fuzzstring("/.../.../.../.../"); <br> fuzzstring("C:\\"); <br> fuzzstring("C:"); <br> fuzzstring("C:\\$Mft"); <br> fuzzstring("../../../../../../../../../../etc/hosts%00"); fuzz string("../../../../../../../../../../etc/hosts"); <br> fuzzstring("../../../../../../../../../../etc/passwd%00"); <br> fuzzstring("../../../../../../../../../../etc/passwd"); <br> fuzzstring("../../../../../../../../../../etc/shadow%00"); <br> fuzzstring("../../../../../../../../../../etc/shadow"); <br> fuzzstring("../../../../../../../../../../boot.ini%00"); <br>     fuzzstring("../../../../../../../winnt/system32/"); <br>     fuzzstring("/localstart.asp%20"); /*old htw trick*/ <br>     fuzzstring("immunitysec.com"); <br>     fuzzstring(".immunitysec.com"); <br>     fuzzstring("\\\\*"); <br>     fuzzstring("\\\\?\\"); <br> : <br> : <br> strcpy(buffer,"%n%n%n%n%n%n%n%n%n%n%n%n%n %n%n%n%n%n%n%n%n"); <br>     fuzzstring(buffer); <br>     fuzzstring("%.50000x"); | result = srand((unsigned)time(NULL)); <br> : <br> : <br> r= 1 + (result%10); <br> /*test*/ <br> /*r=5;*/ <br>   memset(longstring,0x41,sizeof(longstring)); <br>   switch (r) { <br>     case 1: <br>       s__random__dce__string( ); <br>       break; <br>     case 2: <br>       s__intelword(rand( )); <br>       break; <br>     case 3: <br>       s__intelword(0); <br>       break; <br>       case 4: <br>       /*a guid sorta*/ <br>     s__binary("01020304050607080102030405060708"); <br>       break; <br> : <br> : |

The packet injector includes a TCP wrapper for performing predetermined processes for TCP communication such as a socket generation process, a bind process, a listen process, and an accept process, and a listener for embodying a function for defining a data structure used for fuzzing and processing the defined data structure.

The fuzzing system of a DCE RPC object according to the present embodiment uses three data sets at each module. The three data sets will be described, hereinafter.

In the present embodiment, the data sets include an idl data set, a Named Pipe (NMPipe) data set, and a random data set.

In order to insert all of test cases, following data sets may also exist as well as the previously defined data set and the random number data set.

Function for generating a user defined input value=$f(x \cdot y)$

·: concatenate operator $x = \{0, 1, 2, \ldots, a, f\}$ $y: \{0, 1, 2, \ldots, a, f\}$ In the function, x denotes upper four bits of one input byte, and y denotes lower four bits of the input byte.

The x value for upper four bits and the y value for lower four bit are generated, and the upper four bits and the lower four bits are combined to a 8-bit value using the concatenate operator. Using the function, all of numbers 00 to ff can be tested.

Figure 2:
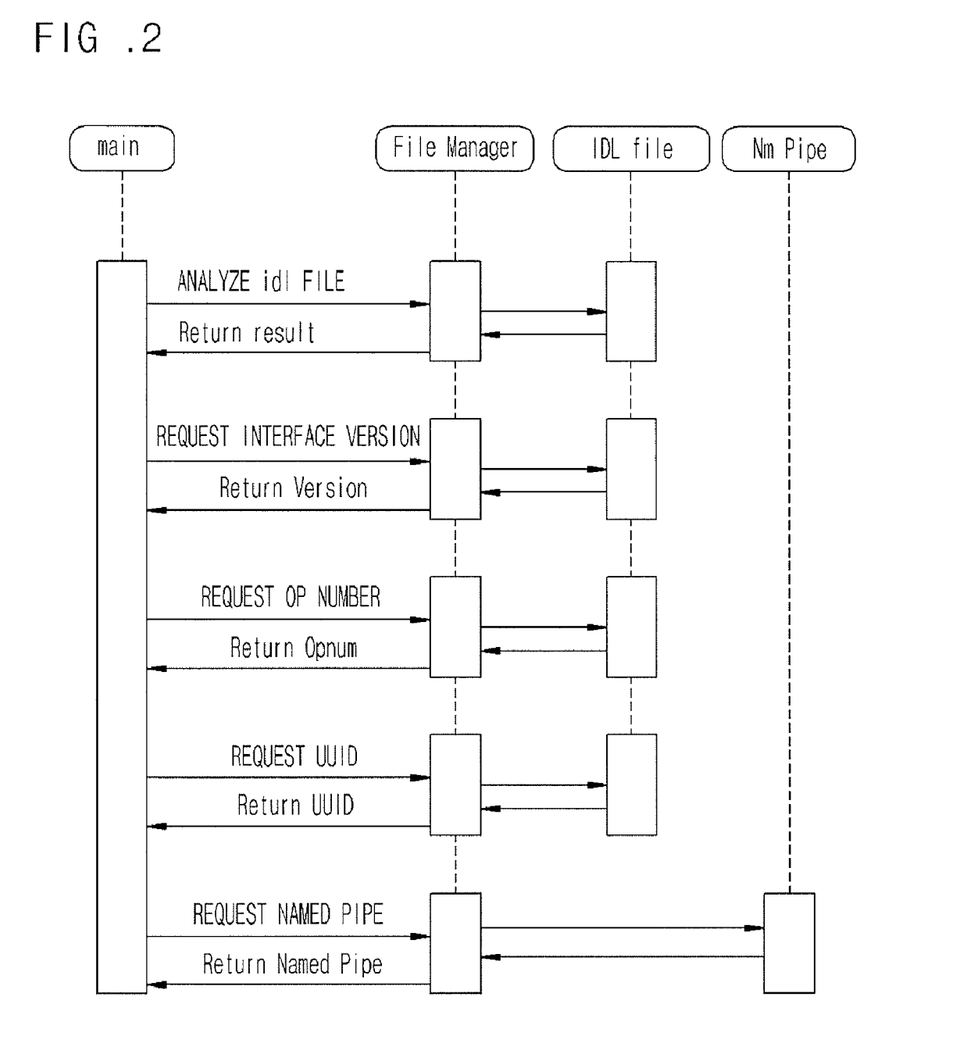
FIG. 2 is a flowchart illustrating the operations of a file manager module.

FIG. 2 is a flowchart illustrating the operations of a file manager module.

As shown in FIG. 2, the file manager analyzes an idl file (IDL) and a Named Pipe file (Nm pipe) and collects necessary information for fuzzing.

When the idl file is analyzed, it is required to change the name of a corresponding file to 'testing.idl'. Then, necessary information such as a UUID, a Version, and an OP number is obtained by parsing the file 'testing.idl'. Named Pipe information matched with a corresponding UUID is obtained by parsing the Named Pipe data set which is previously defined to obtain Named Pipe information corresponding to an UUID given when fuzzing. The file manager performs operations as follows.

In operation ①, the file manager determines whether a file 'testing.idl' exists or not.

That is, the file manager determines whether an idl file of target software for fuzzing exists or not in the operation ①. If the idle file exists, following operations are continuously performed. If not, a random UUID is inserted.

In operation ②, the file manager obtains interface version information.

The file manager parses the character string of a version defined in an idle property defining unit in order to obtain the interface version information as shown in FIG. 5.

In operation ③, the file manager obtains an interface OP number.

Figure 6:
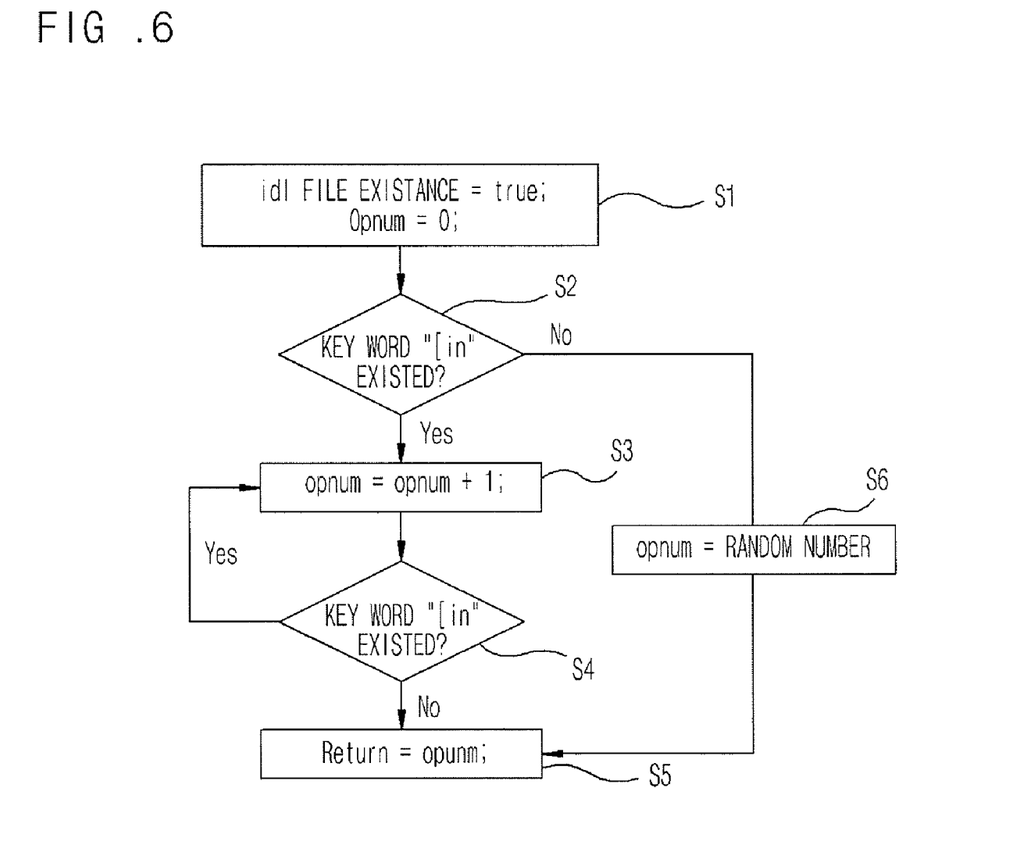
FIG. 6 is a flowchart illustrating an algorithm for obtaining an Op number.

The file manager obtains the number of functions defined in an idl function defining unit as shown in FIG. 5. An algorithm for obtaining the interface OP number is shown in FIG. 6. The number of functions, a value inputted as an OP number variable, is more than one due to the characteristics of the interface function, and the interface function is a function receiving an external value. Therefore, the number of functions is defined according to whether a keyword "[in" exists or not. If the idl file exists, the number of initial function is defined as '0' at step S1. Then, it is determined whether the keyword "[in" exists or not at step S2. If the keyword "[in" exists at the step S2, the number of functions repeatedly increases at step S3 and S4 and the number of functions is returned at step S5. If the keyword "[in" does not exist, a random number is inserted as the number of a function at step S6.

In operation ④, the file manager obtains an interface UUID.

The file manager parses the character string of an UUID defined in an idl property defining unit to obtain a 36-byte UUID as shown in FIG. 5.

In operation ⑤, the file manager obtains Name pipe information corresponding to a UUID.

FIG. 7 shows a data set having Named Pipe mapped to an UUID. The file manager searches a Named Pipe matched with a UUID obtained from the previous operation to obtain the Name pipe information. If no matched UUID is searched, random 36-byte data is inputted.

Figure 3:
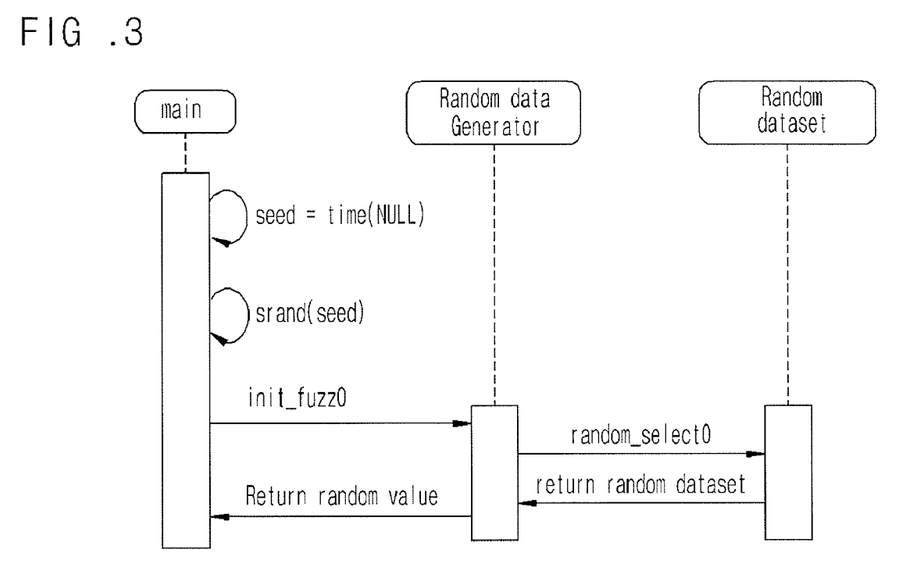
FIG. 3 is a flowchart illustrating the operations of a random data generator.

FIG. 3 is a flowchart illustrating the operations of a random data generator according to an embodiment of the present invention.

As shown in FIG. 3, the random data generator generates a random value. The generated random value is inputted to a target object for fuzzing such as a service factor or a protocol field. The random data generator performs operations as follows.

In operation ①, a function srand( ) generates a random value using a system clock as a factor.

In order to generate a random value using the function srand( ), a clock value of a current system is generated using a function time( ), and the generated clock value is inputted to the function srand( ) as a factor.

In operation ②, a function init_fuzz( ) initializes a buffer defined for storing character strings and various random numbers.

In operation ③, a function random_select( ) randomly selects one random numbers in the buffer.

The function random_select( ) selects more than one of various random numbers or pre-defined character strings and stores the selected random number or the selected character string.

Figure 4:
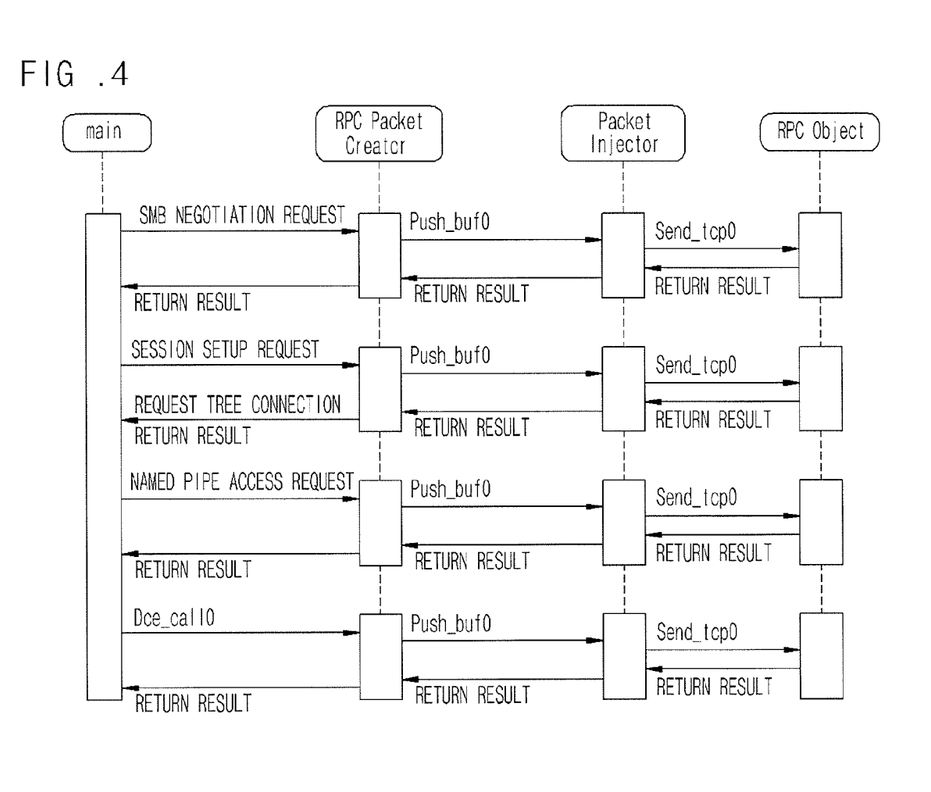
FIG. 4 is a flowchart illustrating the operations of a packet creator module and a packet injector module.

FIG. 4 is a flowchart illustrating the operations of a packet creator and a packet injector.

As shown in FIG. 4, the RPC packet creator module generates a packet for RPC communication and stores packets for communicating with a RPC based program from a file manager module and values obtained from the random data generator in a buffer.

The packet injector transmits a random value stored in a buffer to a target object for fuzzing. The RPC packet creator and the packet injector perform operations as follows.

In operation ①, a Main function calls a function smb_nego( ) for initiating the negotiation between the RPC fuzzing target system and the SMB protocol.

The RPC packet creator embodies a SMB communication mechanism and generates a packet in order to access a fuzzing target service. In a SMB level, a negotiation process, a session setup process, a tree connection process, a Named Pipe access process are performed to access a service.

In operation ②, a packet creator generates a SMB packet and a RPC bind packet and stores corresponding packets in a buffer by calling a function push_buf( ).

In a SMB level, a packet is generated for performing the four processes, and a RPC bind packet is generated. Also, it is possible to call a service function according to a related option, and the generated packets are inputted into a buffer.

In operation ③, the packet injector transmits a packet to a target program for fuzzing by calling a function send_tcp( ) in order to transmit packets stored in a buffer.

The function send_tcp( ) transmits the generated packet to a target protocol for fuzzing using TCP.

In operation ④, the target protocol or target software for fuzzing receives a packet, processes the received packet, and transmits a response thereof.

In operation ⑤, the target object for fuzzing is accessed by continuously performing a session setup process, a tree connection process, and a Named Pipe access process performed after calling predetermined functions for communicating with a RPC based program such as smb_nego( ). Then, a packet with fuzzing data is transmitted.

As shown in FIG. 4, the four functions are continuously called in a SMB level, which are a set of processes for communicating with a target object for fuzzing, and a function for a DEC RPC binding step is called. Then, it becomes possible to call a function of a target program for fuzzing. A previously generated random value is inputted to a last target function for fuzzing in order to perform a fuzzing process.

Figure 8:
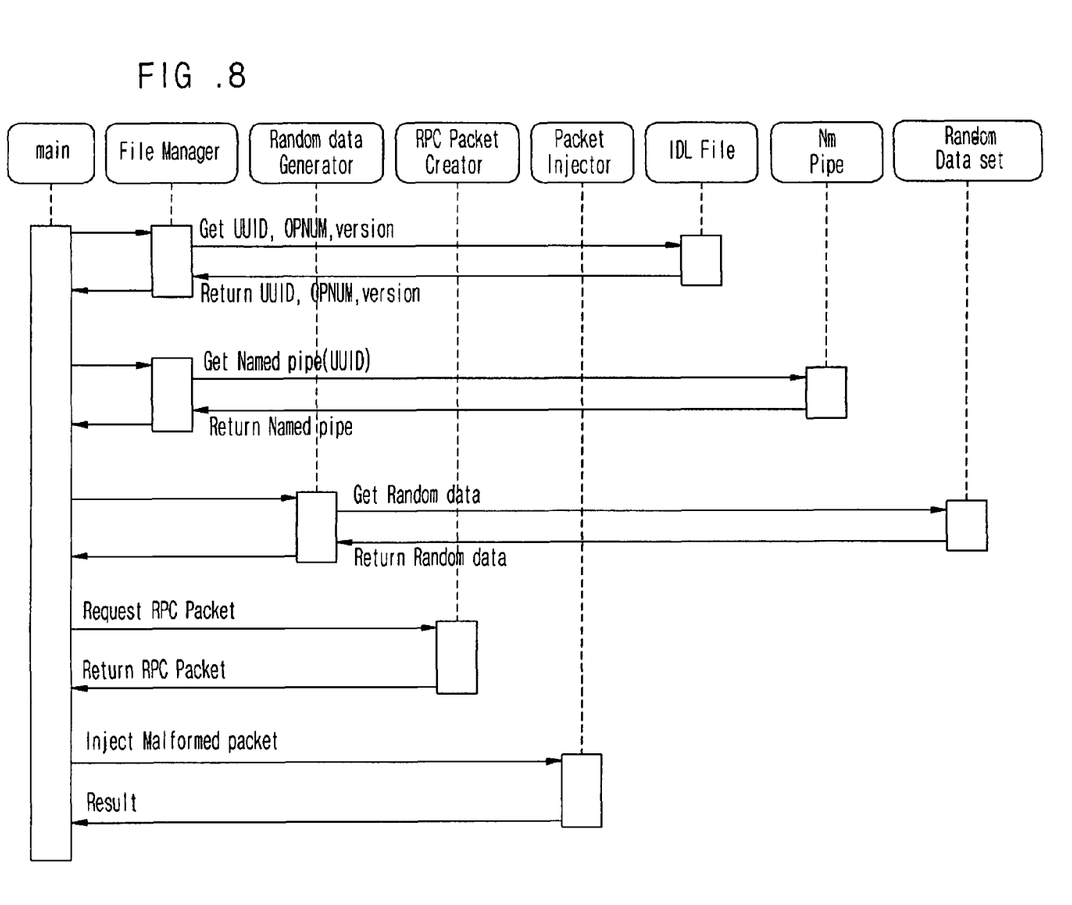
FIG. 8 is a flowchart illustrating the operations of an entire system.

FIG. 8 is a flowchart illustrating the operations of an entire system.

As shown in FIG. 8, the file manager obtains necessary information including a UUID, an interface version, and an Op number by parsing the idl file. Among the obtained information, the UUID is used to obtain the Named Pipe information mapped to the UUID. Herein, a previously defined Named Pipe data set is used. Then, a random number for fuzzing is obtained from the random data set.

Then, the RPC packet creator generates a RPC packet for accessing a target object for fuzzing and transmits the obtained UUID, the interface version, the Op number, the Named Pipe information, and the random value to the packet injector. The packet injector inserts the transmitted information into a packet.

It will be apparent to those skilled in the art that various modifications and variations can be made in the present invention. Thus, it is intended that the present invention covers the modifications and variations of this invention provided they come within the scope of the appended claims and their equivalents.

As described above, the fuzzing system and method of a DCE RPC according to an embodiment of the present invention enable a user to perform a fuzzing process without knowledge for a target object for fuzzing by automatically obtaining necessary information including an UUID, an interface version, an Op number, and Named pipe information from the idl file when a fuzzing process is performed on DCE RPC software and protocol. Therefore, a user can conveniently perform the fuzzing process, the cost for performing the fuzzing process is reduced, and the time for performing the fuzzing process is shortened.

What is claimed is:

1. A fuzzing system of a distributed computing environment (DCE) remote procedure call (RPC) object, comprising:
    a computer;
    a file manager on the computer for obtaining necessary information by parsing and analyzing an (interface definition language) idl file for a target object for fuzzing and a file having information about a Named Pipe file;
    a random data generator for generating a random value using a system clock as a factor;
    a (remote procedure call) RPC packet creator for embodying protocols used for RPC communication by functions and generating a RPC packet for RPC communication; and
    a packet injector for inserting the necessary information and the random value into the generated RPC packet and transmitting the generated RPC packet to the target object for fuzzing;
    wherein the file manager includes:
        an interface definition language (IDL) parser and a network management protocol (NMP) parser for parsing an idl file and a file having information including a Named Pipe file; and an IDL parser and a NMP parser for obtaining the necessary information by analyzing an idl file and a Named Pipe file;
        wherein the necessary information includes a universal unique identifier (UUID), an interface version, and an(operation) Op number, which are obtained with reference to the idl file.

2. The fuzzing system of claim 1, wherein the UUID and a Named Pipe are a mapped data set.

3. The fuzzing system of claim 1, wherein the random data generator includes:
    a random data generator for processing a random value or a previously-defined attacking character string; and
    a user defined generator for processing a user defined input.

4. The fuzzing system of claim 1, wherein the RPC packet creator includes:
    a RPC protocol analyzer for analyzing a RPC protocol after a SMB protocol and a RPC protocol for RPC communication are embodied by functions; and
    a RPC protocol creator for reassembling a packet for RPC communication.

5. The fuzzing system of claim 1, wherein the packet injector includes:
    a TCP wrapper for performing predetermined processes for TCP communication including a socket generation process, a bind process, a listen process, and an accept process; and
    a listener for embodying a function of defining a data structure used for fuzzing and processing the defined data.

6. A fuzzing method of a distributed computing environment (DCE) remote procedure call (RPC) object, comprising the steps of:
    a) obtaining necessary information on a computer from an idl file for a target object for fuzzing and a file including information about a Named Pipe file at a file manager, and generating a random value using a system clock as a factor at a random data generator;
    b) at a (Remote procedure call) RPC packet creator, embodying protocol used for RPC communication by function and generating a RPC packet for RPC communication ; and
    c) at a packet injector, inserting the necessary information and the random value into a RPC packet generated from the RPC packet creator for the RPC communication and transmitting the generated RPC packet to a target object for fuzzing;
    wherein the file manager includes:
    at an interface definition language (IDL) parser and a network management protocol (NMP) parser , parsing an idl file and a file having information including a Named Pipe file; and
    an IDL parser and a NMP parser for obtaining the necessary information by analyzing an idl file and a Named Pipe filer;
    wherein the necessary information includes a universal unique identifier (UUID), an interface version, and an(operation) Op number, which are obtained with reference to the idl file.

7. The fuzzing method of claim 6, wherein the Named Pipe file is selected from a data set having information about a Named Pipe mapped to a UUID used by the target object for fuzzing.

8. The fuzzing method of claim 6, wherein the interface version is obtained by parsing a character string of a version defined in an idl property defining unit.

9. The fuzzing method of claim 6, wherein the Op number defines the number of functions according to whether a keyword "[in" is present or not.

10. The fuzzing method of claim 6, wherein the UUID is obtained by parsing a character string of an UUID defined in an idl property defining unit.

11. The fuzzing method of claim 6, wherein a random UUID is inserted if a file 'testing.idl' does not exist, which is an idl file for the target object for fuzzing.

12. The fuzzing method of claim 6, wherein the random value is selected from a previously defined data set formed of known attacking character strings and a data set randomly generated using a function for generating a random number.

13. The fuzzing method of claim 6, wherein the step a) includes the steps of:
generating a random value using a system clock value as a factor;
generating a random value using a system clock value as a factor; initializing a buffer for storing existing character strings or various random values; and randomly selecting more than one of the random values stored in the buffer.

14. The fuzzing method of claim 6, wherein the step b) includes steps of:
negotiating a SMB protocol with the target object for fuzzing;
generating a SMB packet and a RPC bind packet and storing corresponding packets in a buffer; transmitting the packets stored in the buffer to the target object for fuzzing; and
at the target object for fuzzing, performing a fuzzing process and transmitting a response.

* * * * *